Sept. 7, 1943.    B. E. HOUSE    2,328,720
PARKING BRAKE
Filed Dec. 9, 1940    2 Sheets-Sheet 1

INVENTOR
BRYAN E. HOUSE
BY
M. W. McConkey
ATTORNEY

Sept. 7, 1943.   B. E. HOUSE   2,328,720
PARKING BRAKE
Filed Dec. 9, 1940   2 Sheets-Sheet 2

INVENTOR
BRYAN E. HOUSE
BY
M. W. McConkey
ATTORNEY

Patented Sept. 7, 1943

2,328,720

UNITED STATES PATENT OFFICE 2,328,720

PARKING BRAKE

Bryan E. House, South Bend, Ind., assignor to Bendix Aviation Corporation, South Bend, Ind., a corporation of Delaware Application December 9, 1940, Serial No. 369,181

7 Claims. (Cl. 74—536)

This invention relates to brakes and particularly to brakes actuable through the medium of mechanical parts and connections.

My invention is illustrated as it might be used in conjunction with an emergency or parking brake for an automotive vehicle. However, it is applicable to any type of brake wherein it is desirable to exert manually created force in actuating a brake control element at a distance therefrom.

The chief object of my invention is to provide an emergency or parking brake which will automatically lock in applied position, but which may be released by movement of the applying lever without the independent actuation of any sort of release mechanism. The invention contemplates the use of a control lever for the brakes which is automatically locked in applied position by pawl and ratchet connections between the control lever and a stationary member, and which is automatically released by movement of the manually controlled end of the control lever to swing the said lever about a pivot intermediate its ends.

Movement of the manually actuable end of the control lever in one direction actuates the mechanical linkage to apply the brakes and the said linkage is automatically set in applied position. When the manually actuable end of the lever is moved in the opposite direction the locking means is first automatically released to allow free movement of the control lever and the lever then moves to release the tension on the mechanical linkage and to thus release the brake.

Other objects and features of my invention will become apparent during the course of the following description, reference being had therein to the accompanying drawings, in which.

Figure 1:
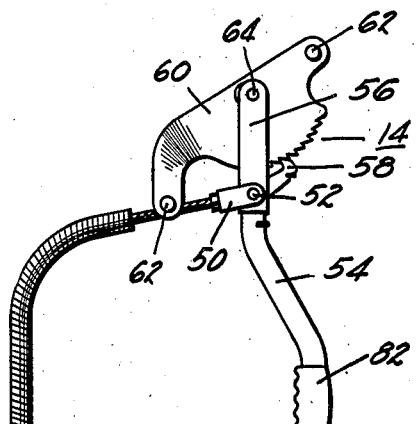
Figure 1 shows a conventional wheel brake assembly connected to my improved controlling means.
Figure 1:
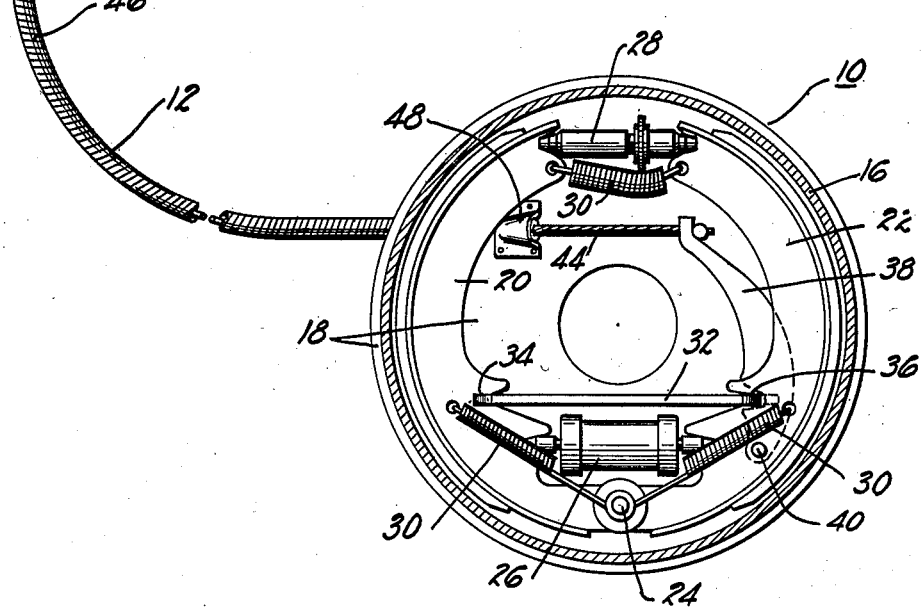

The device of Figure 1 comprises generally a wheel and brake assembly 10, a cable and conduit linkage 12, and a brake control assembly 14. The wheel and brake assembly 10 includes a rotatable brake drum 16, and a non-rotatable support or backing plate 18 having mounted thereon a pair of shoes 20 and 22, an anchor 24, and a hydraulic applying unit 26. An adjustable link 28 is provided between the ends of the shoes and a plurality of return springs 30 are supplied to return the parts of the brake assembly to their original position whenever applying pressure is released subsequent to a brake application.

Mechanical connections for spreading the shoes 20 and 22 to bring their outer surfaces into contact with the brake drum 16 include a thrust link 32 contacting the shoe 20 at 34 and contacting at 36 an applying lever 38. The applying lever 38 is pivoted at 40 on the shoe 22 and is connected at its opposite end to a cable 44 which forms part of the aforementioned cable and conduit linkage 12. The cable 44 extends into and through a conduit 46, the conduit being secured by a bracket 48 to the support or backing plate 18.

Referring to Figures 2 to 5 inclusive, it will be noted that the cable 44 is provided at its end adjacent the control assembly 14 with a clevis 50, the clevis having an opening therein through which extends an elongated pin or pivot member 52. The pin or pivot member 52 also extends through and serves as a pivot for a lever 54 which is adapted to be controlled by manual force exerted to apply and release the brakes. The pin 52 likewise extends through an opening in one end of a support piece 56 and through an opening in a small bell crank lever 58. Each of the openings in the several parts or members through which the pin 52 extends is circular and has a diameter approximately equal to the diameter of the body portion of the pin 52.

A stationary ratchet member 60 is secured to the vehicle frame or body in any suitable position, openings 62 being provided in the member 60 for the insertion of bolts or screws. A pin or pivot member 64 extends through a circular opening 66 in the stationary member 60. The pin 64 also extends through a circular opening 68 in the support piece 56 and through an elongated opening 70 in the lever 54 adjacent one end of the said lever.

Each of the openings 66 and 68 has a diameter approximately equal to the diameter of the body portion of pin or pivot member 64. The pin 64 is therefore held stationary by its connection with the fixed ratchet member 60, and serves to hold the upper end of the support piece 56 from movement. The elongated slot 70 in the lever 54 allows the upper end of the lever to be moved relative to the pin 64 and it is this relatively small movement which makes possible automatic release of the pawl and ratchet connection when it is desired to release the brakes.

The bell crank member 58 has at one end thereof a pawl 72 which is adapted to engage at times the teeth of a ratchet-shaped surface 74 on the fixed ratchet member 60. The other side or end of the bell crank member 58 has an extension 76 which is so positioned to at times come into contact with the side of a small projection or abutment 78 fixed to or integral with the lever 54. A coil spring 80 has one end caught on the lever 54 and the other end caught on the bell crank member 58 adjacent the pawl 72. The spring 80 thus serves to hold the pawl 72 in engagement with the teeth of the ratchet surface 74 except at such times as the projection 78 contacting the extension 76 on the bell crank member 58 holds the pawl 72 out of contact with the teeth of the ratchet surface 74 against the force exerted by the spring 80.

The lower end on the lever 54 has a handle 82 to which manual force is applied in applying and releasing the brake. Applying force is exerted to move the handle 82 toward the right, while moving the handle 82 toward the left operates to release the brake after it has been applied and has been locked in applying position.

Figure 2:
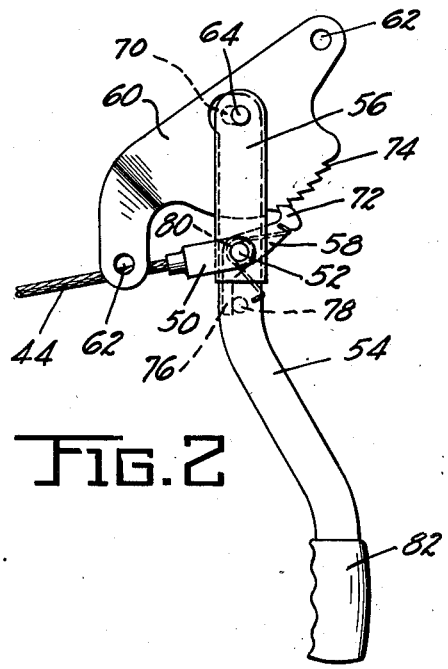
Figure 2 shows in closeup a front elevation of my improved brake controlling means; in the position shown in Figure 2 the brake is released.
Figure 3:
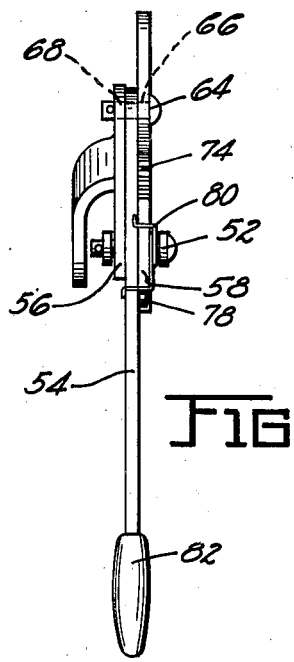
Figure 3 shows the brake controlling means of Figure 2 in side elevation.

Operation of the device heretofore generally described is as follows. The handle 82 of lever 54 is moved to the right from its position as shown in Figure 2. The lever 54 pivots on the pin 64 and the manual applying force exerted on the lever handle pulls the cable 44 which, moving relatively to the conduit 46, swings the lever 54 to move the shoes 20 and 22 into contact with the drum. The lever 54 in spreading the shoes acts through the medium of the link 32 and the pivot 40.

Figure 4:
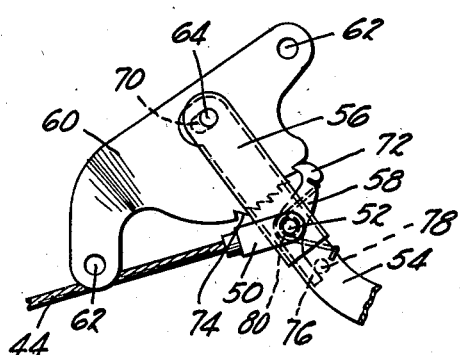
Figure 4 shows the position of the controlling means of Figure 2 when the brakes are in applied position and the control lever is locked by the pawl and ratchet connection.
Figure 5:
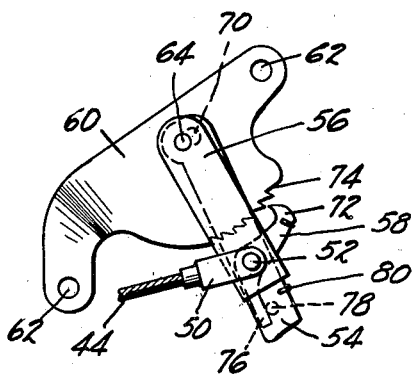
Figure 5 shows the position of the controlling means of Figure 2 immediately after the manually actuable end of the control lever has been started toward its released or original position.

As the applying lever 54 pivots about the point 64 to exert a pull on the cable 44, the pawl 72 successively picks up one after another of the teeth on the ratchet surface 74. When there is no longer any applying force being exerted on the lever 54 the pawl 72 will remain in contact with the last of the teeth picked up during application of the brake and the contact between pawl and tooth will lock the brake in applied position, as shown in Figure 4.

When the brake is to be released, the operator pushes the handle 82 to the left. Since the pawl 72 is caught in one of the ratchet teeth the pin 52 which connects the lever 54 to the cable will be prevented from immediately moving to the left to allow release of the brakes. The lever 54 will therefore temporarily pivot about the point 52 with the result that the end of the lever having the elongated slot 70 will swing to the right, the slot allowing movement of the lever relative to the pin 64. The lever 54 now assumes the position shown in Figure 5. The slight rotation of the lever about the point 52 causes the projection 78 to contact extension 76 on the bell crank member 58, moving the pawl 72 away from the ratchet surface 74 and out of contact with the ratchet teeth. The cable 44 under the influence of the return springs in the wheel brake, now moves rapidly to the left allowing complete release of the brake. Depending upon the manner in which the brake is released, the pawl may or may not be in contact with the teeth of the ratchet during the period when the brake remains released. This is, however, immaterial since the first applying movement of the lever 54 will, if the lever slot is in the position shown in Figure 5, cause the lever 54 to temporarily rotate about the pin 52 until the lever assumes the position of Figure 2 and the pawl once more contacts the ratchet teeth.

While I have described a single embodiment of my invention, it is not my intention to be limited thereto or to be limited otherwise than by the terms of the appended claims.

I claim:

1. Brake control mechanism comprising a stationary ratchet member having a toothed surface and having an opening therein; a lever having an elongated slot therein near one of its ends, a handle adjacent its opposite end, an opening therein intermediate the elongated slot and the handle, and a projection thereon intermediate the opening and the handle; a pawl member having a pawl at one end thereof, an extension at the other end thereof and an opening therethrough; a support piece having a pair of openings therein; a brake actuating cable; a connecting element connected to the cable and having an opening therein; a pin extending through the opening in the ratchet member, the elongated slot in the lever and one of the openings in the support piece; a second pin extending through the opening in the pawl member, through the opening in the lever, through one of the openings in the support piece and through the opening in the connecting element; and a spring bearing at one end against the lever and at the other end against the pawl and tending to move the pawl in the direction of the toothed surface of the ratchet member.

2. Brake applying mechanism comprising brake actuating linkage, a lever for moving the linkage to actuate the brakes, a pivot about which the lever rotates when it is moving in a brake actuating direction, pawl and ratchet means for automatically locking the lever in position after the brakes have been actuated, a secondary pivot about which the lever may be rotated, and a projection on the lever for contacting the pawl to release the pawl and ratchet lock whenever the lever is rotated about its secondary pivot.

3. Brake control mechanism comprising a stationary ratchet member having a toothed surface and having an opening therein; a lever having an elongated slot therein near one of its ends, a handle adjacent its opposite end, an opening therein intermediate the elongated slot and the handle, and a projection thereon intermediate the opening and the handle; a pawl member having a pawl at one end thereof adapted to at times lock with the teeth on the surface of the ratchet member, an extension at the other end of the pawl adapted to at times contact the projection on the lever, and an opening through the pawl; a brake actuating cable; a clevis connected to the cable and having an opening therein; a pin extending through the opening in the ratchet member and the elongated slot in the lever; a second pin extending through the opening in the pawl member, through the opening in the lever, and through the opening in the clevis; and a spring bearing at one end against the lever and at the other end against the pawl and tending to move the pawl in the direction of the toothed surface of the ratchet member.

4. Brake control mechanism comprising a stationary ratchet member having a toothed surface and having an opening therein; a lever having an elongated slot therein near one of its ends, a handle adjacent its opposite end, an opening therein intermediate the elongated slot and the handle, and a projection thereon intermediate the circular slot and the handle; a pawl member having a pawl at one end thereof adapted to at times lock with the teeth on the surface of the ratchet member, an extension at the other end of the pawl adapted to at times contact the projection on the lever, and an opening through the pawl; brake actuating linkage having an element with an opening therein; a pin extending through the opening in the ratchet member and the elongated slot in the lever; and a second pin extending through the opening in the pawl member, through the opening in the lever, and through the opening in the brake linkage element.

5. Brake control mechanism comprising a fixed member having a toothed surface and having an opening therein; a lever having an elongated slot therein near one of its ends, an opening therein, and a projection thereon; a locking member adapted to at times lock with the teeth on the surface of the said fixed member and having an extension adapted to at times contact the projection on the lever, the said locking member having an opening therethrough; brake actuating linkage having an element with an opening therein; a pivot member extending through the opening in the fixed member and the elongated slot in the lever; and a second pivot member extending through the opening in the locking member, through the opening in the lever, and through the opening in the brake linkage element.

6. Brake control mechanism comprising a lever having a pin and slot connection with a fixed member and having a projection thereon, a locking member pivoted on the lever and adapted to at times cooperate with a fixed member to maintain the lever in position, said locking member having a surface which is at times contacted by the projection on the lever, and brake actuating linkage connected to the lever, the lever pivoting at the pin and slot connection during movement in one direction and pivoting on the locking member during movement in the opposite direction until such time as the projection on the lever contacts the locking member and moves it out of engagement with the cooperating fixed member.

7. Brake control mechanism comprising a lever having a lost motion connection with a fixed member and having a projection thereon, a locking member pivoted on the lever and adapted to at times cooperate with a fixed member to maintain the lever in position, said locking member having a surface which is at times contacted by the projection on the lever, and brake actuating linkage connected to the lever, the lever pivoting at the lost motion connection during movement in one direction and pivoting on the locking member during movement in the opposite direction until such time as the projection on the lever contacts the locking member and moves it out of engagement with the cooperating fixed member.

BRYAN E. HOUSE.